US012286231B2

(12) United States Patent
Prathipati et al.

(10) Patent No.: US 12,286,231 B2
(45) Date of Patent: Apr. 29, 2025

(54) SYSTEM INCLUDING STOWAGE POUCH

(71) Applicant: B/E Aerospace, Inc., Winston-Salem, NC (US)

(72) Inventors: Krishna Chaitanya Prathipati, Hyderabad (IN); Ravindra Ramulu Kandukuri, Secunderabad (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 199 days.

(21) Appl. No.: 18/135,392

(22) Filed: Apr. 17, 2023

(65) Prior Publication Data
US 2024/0002058 A1 Jan. 4, 2024

(30) Foreign Application Priority Data

Jul. 2, 2022 (IN) .............................. 202211038223

(51) Int. Cl.
B64D 11/06 (2006.01)
B64D 11/00 (2006.01)

(52) U.S. Cl.
CPC ........ *B64D 11/0627* (2014.12); *B64D 11/003* (2013.01)

(58) Field of Classification Search
CPC .......................... B64D 11/0627; B64D 11/003
USPC ........................................ 297/188.08, 188.12
See application file for complete search history.

(56) References Cited

U.S. PATENT DOCUMENTS 5,345,633 A 9/1994 Harnish
7,338,131 B2 * 3/2008 Forgatsch .............. B64D 11/06
297/188.08
7,517,014 B2 4/2009 Schroeder et al.
7,530,631 B2 5/2009 Skelly et al.
7,841,658 B1 11/2010 Marble
8,128,163 B2 3/2012 Alberti
10,293,943 B1 5/2019 Pozzi et al.
2001/0050499 A1* 12/2001 DeLoach ................. B60N 2/68
297/188.08
2007/0152480 A1 7/2007 Muin et al.
(Continued)

FOREIGN PATENT DOCUMENTS

CN 108583374 A 9/2018

OTHER PUBLICATIONS

"Glove Box Under Seat Bags by Diestco", Mobilit-Aids.com; https://www.mobility-aids.com/glove-box-under-seat-bag.html.
(Continued)

*Primary Examiner* — Anthony D Barfield
(74) *Attorney, Agent, or Firm* — Suiter Swantz IP

(57) ABSTRACT

A system includes a seat frame. The seat frame includes a fore beam and an aft beam. The system includes a pouch. The pouch includes: an opening; a top panel extending from the opening; an end panel abutting the top panel; a first side panel abutting the top panel and the end panel; a second side panel abutting the top panel and the end panel; a bottom panel abutting the first side panel, the second side panel, and the end panel; a curved panel extending from the opening toward the bottom panel and abutting the first side panel, the second side panel, and the bottom panel; a closeout flap extending from a top edge of the opening and abutting the top panel; aft straps attached to the top panel and secured around the aft beam; and fore straps attached to the top panel and secured around the fore beam.

17 Claims, 9 Drawing Sheets

(56) References Cited

U.S. PATENT DOCUMENTS

| | | | |
|---|---|---|---|
| 2008/0061606 A1* | 3/2008 | Skelly | B64D 11/0624 297/188.1 |
| 2017/0246972 A1 | 8/2017 | Wegenka et al. | |
| 2017/0320653 A1 | 11/2017 | Mogil et al. | |
| 2019/0291870 A1 | 9/2019 | Hall | |
| 2019/0389547 A1 | 12/2019 | Tassie | |

OTHER PUBLICATIONS

Extended European Search Report dated Oct. 30, 2023; European Application No. 23182457.4.

* cited by examiner

SYSTEM INCLUDING STOWAGE POUCH

CROSS-REFERENCE TO RELATED APPLICATIONS

The present application is related to and claims priority from: Indian Application Serial Number 202211038223, titled SYSTEM INCLUDING CONNECTOR BRACKET, filed Jul. 2, 2022. Indian Application Serial Number 202211038223 is herein incorporated by reference in its entirety.

BACKGROUND

Current aircraft seating, especially economy class, does not provide a desired amount of storage space to the passengers, especially on long haul planes where passengers carry many personal belongings. Currently, the stowage space, typically, is only a literature pocket for the economy seating, which is already occupied with some magazines.

SUMMARY

In one aspect, embodiments of the inventive concepts disclosed herein are directed to a system. The system includes a seat frame installed in a vehicle. The seat frame includes a seat pan, a fore seat frame beam, and an aft seat frame beam, wherein the fore seat frame beam and the aft seat frame beam are under the seat pan, wherein the fore seat frame beam is parallel to the aft seat frame. The system includes a pliable stowage pouch accessible by a passenger seated behind the seat frame. The pliable stowage pouch includes: an opening located at an aft side of the seat frame; a top panel extending from the opening; an end panel abutting the top panel; a first side panel abutting the top panel and the end panel, the first side panel being elbow-shaped; a second side panel abutting the top panel and the end panel, the second side panel being elbow-shaped; a bottom panel abutting the first side panel, the second side panel, and the end panel; a curved panel extending from the opening toward the bottom panel and abutting the first side panel, the second side panel, and the bottom panel; a closeout flap extending from a top edge of the opening and abutting the top panel, wherein the closeout flap is configured to close the opening in a first state and to open the opening in a second state; aft straps attached to the top panel and secured around the aft seat frame beam; and fore straps attached to the top panel and secured around the fore seat frame beam.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
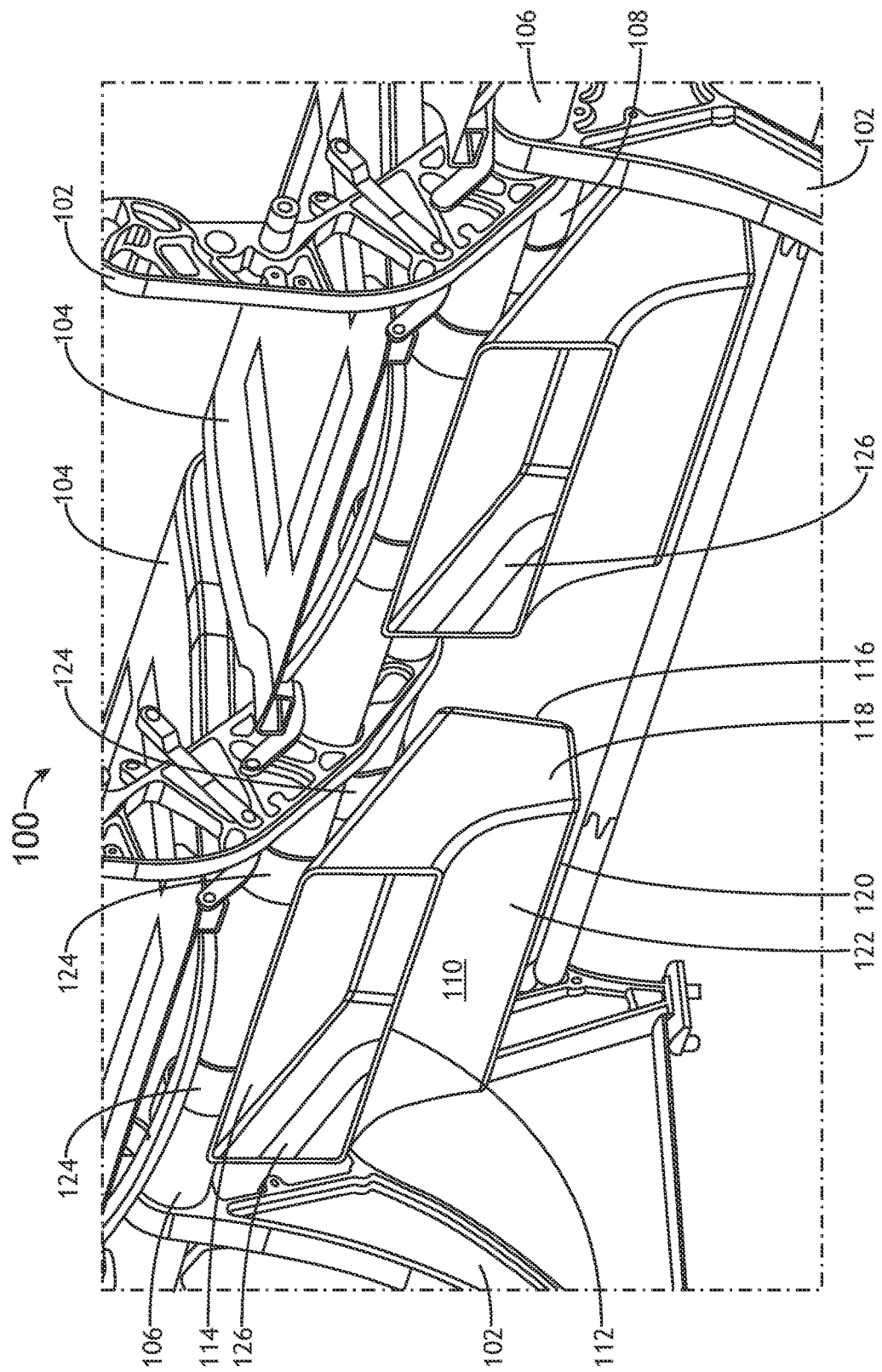
FIG. 1 is an aft side perspective view of an exemplary embodiment of a system including a vehicle including a seat frame and a pliable stowage pouch according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system including a stowage pouch.

In some embodiments, the stowage pouch may be attached to seat frame beams at an aft side of a seat (e.g., a vehicle seat, such as an aircraft seat, a bus seat, or a train seat).

Some embodiments may provide more storage space to a passenger seated behind a seat that the stowage pouch is attached to. For example, the stowage pouch may be used in economy and premium economy seating's without encroaching any of the passenger comfort space, including leg room. The stowage pouch can be attached to seat frame beams, below a seat pan, with the opening facing the aft of the aircraft and to be used by the passenger seating behind the seat installed with the stowage pouch. Such pouch may be big enough to act as an additional stowage for the passengers to store their personal belongings. Some embodiments solve the problem of current seating that does not currently provide enough storage space to the passengers, especially on long-haul planes where passengers carry many personal belongings.

In some embodiments, the stowage pouch may be made of pliable material (e.g., leather or fabric (e.g., canvas or soft cloth)), instead of rigid thermoform plastic. As such, the stowage pouch may be flexible to provide legroom to a passenger that is not impacted due to addition of this feature. Since it's a flexible and/or pliable storage pouch, a passenger can trade-off leg-space comfort verses stowage needs based on their preference and comfort levels. For example, if passenger does not use this additional stowage space, the passenger still has complete leg room as the pliable nature of the pouch allows the passenger to extend their legs. For example, other passengers might use the pouch to store belongings in the middle so that they can stretch their legs on either side of the stowage pouch.

In some embodiments, the stowage pouch uses otherwise unused dead-space to for stowage. Additionally, if the belongings are pushed all the way towards the end of the pouch, the stowage pouch might not take away any of the legroom. The stowage pouch may be big enough to store more belongings of passengers as compared to existing stowage solutions.

In some embodiments, the stowage pouch may include straps secured around the seat frame beams, such as by using buttons, and locations of the buttons may be placed in such a way that the buttons cannot be viewed and accessed by passengers.

In some embodiments, the stowage pouch may include a closeout flap that can be opened and closed by using, e.g., a zipper.

Some embodiments provide a low cost and low weight solution for improving passenger stowage on aircraft. The stowage pouches may have low maintenance costs and may be easily replaceable. Some embodiments include straps that are easy to install around seat frame beams by using buttons or any other suitable fastener.

Referring now to FIG. 1, an aft perspective view of an exemplary embodiment of a system including a vehicle (e.g., aircraft 100, watercraft, automobile, train, etc.) including at least one seat frame 102 (e.g., an aircraft seat frame) and a pliable stowage pouch 110 is depicted according to the inventive concepts. In some embodiments, the system may include at least one multiple seat assembly, which may include multiple connected seats that may be installed as a row of seats.

The seat frame 102 may be installed in a vehicle (e.g., aircraft 100). The seat frame 102 may include a seat pan 104, an aft seat frame beam 106, and a fore seat frame beam 108. The fore seat frame beam 108 and the aft seat frame beam 106 may be under the seat pan 104. The fore seat frame beam 108 may be parallel to the aft seat frame 106.

Figure 3:
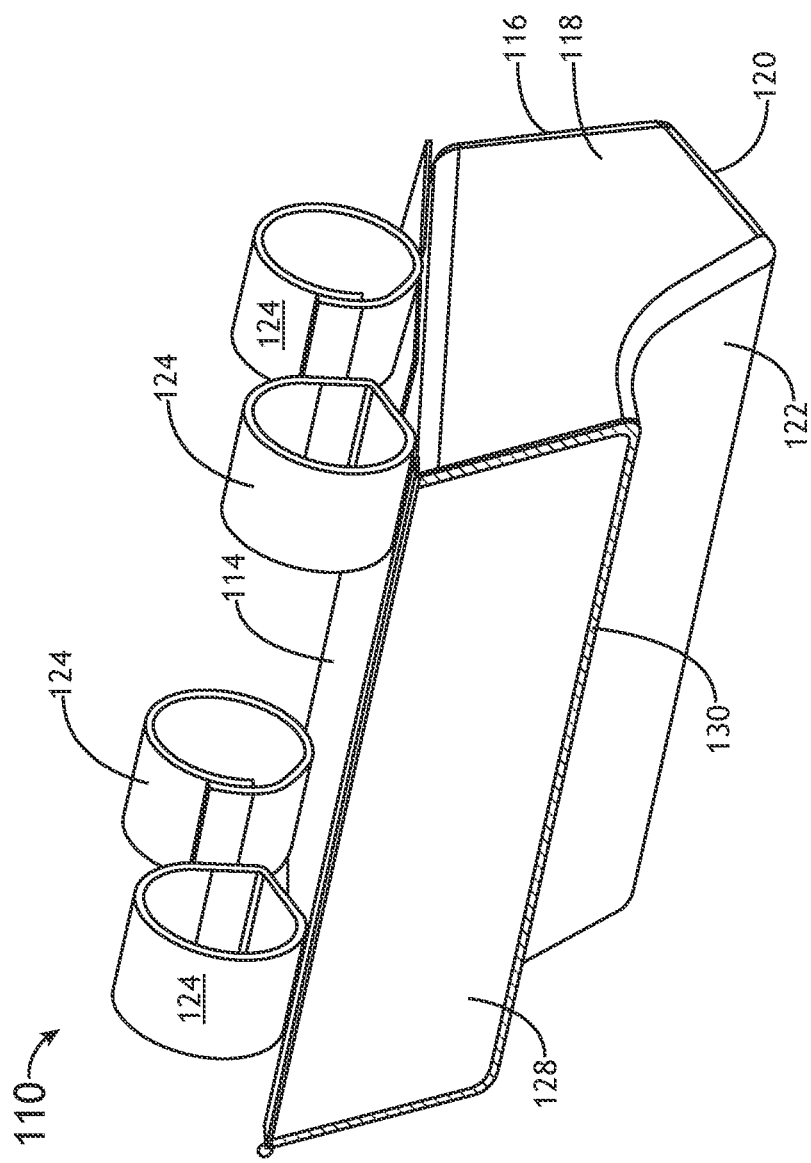
FIG. 3 is an aft side perspective view of the pliable stowage pouch of FIG. 1 according to the inventive concepts disclosed herein.
Figure 4:
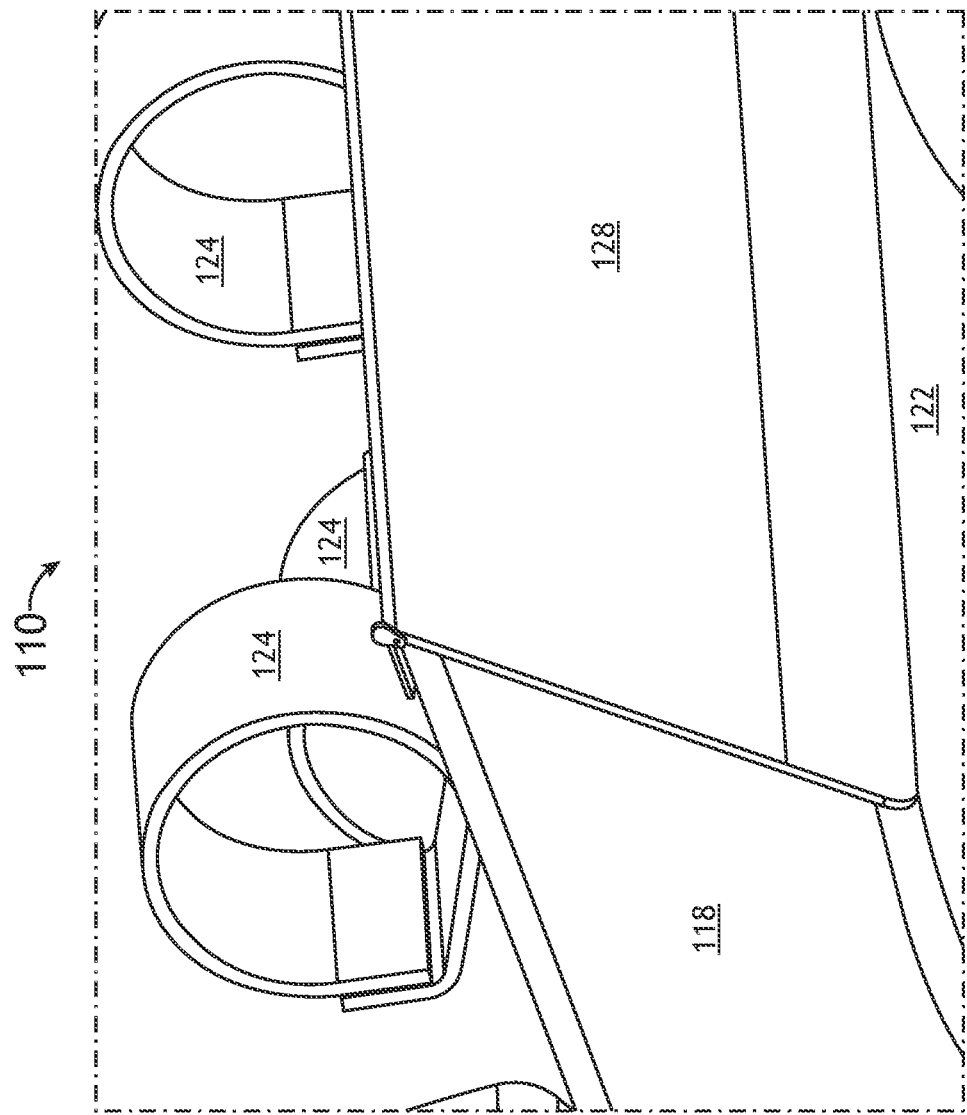
FIG. 4 is another aft side perspective view of the pliable stowage pouch of FIG. 1 according to the inventive concepts disclosed herein.
Figure 6:
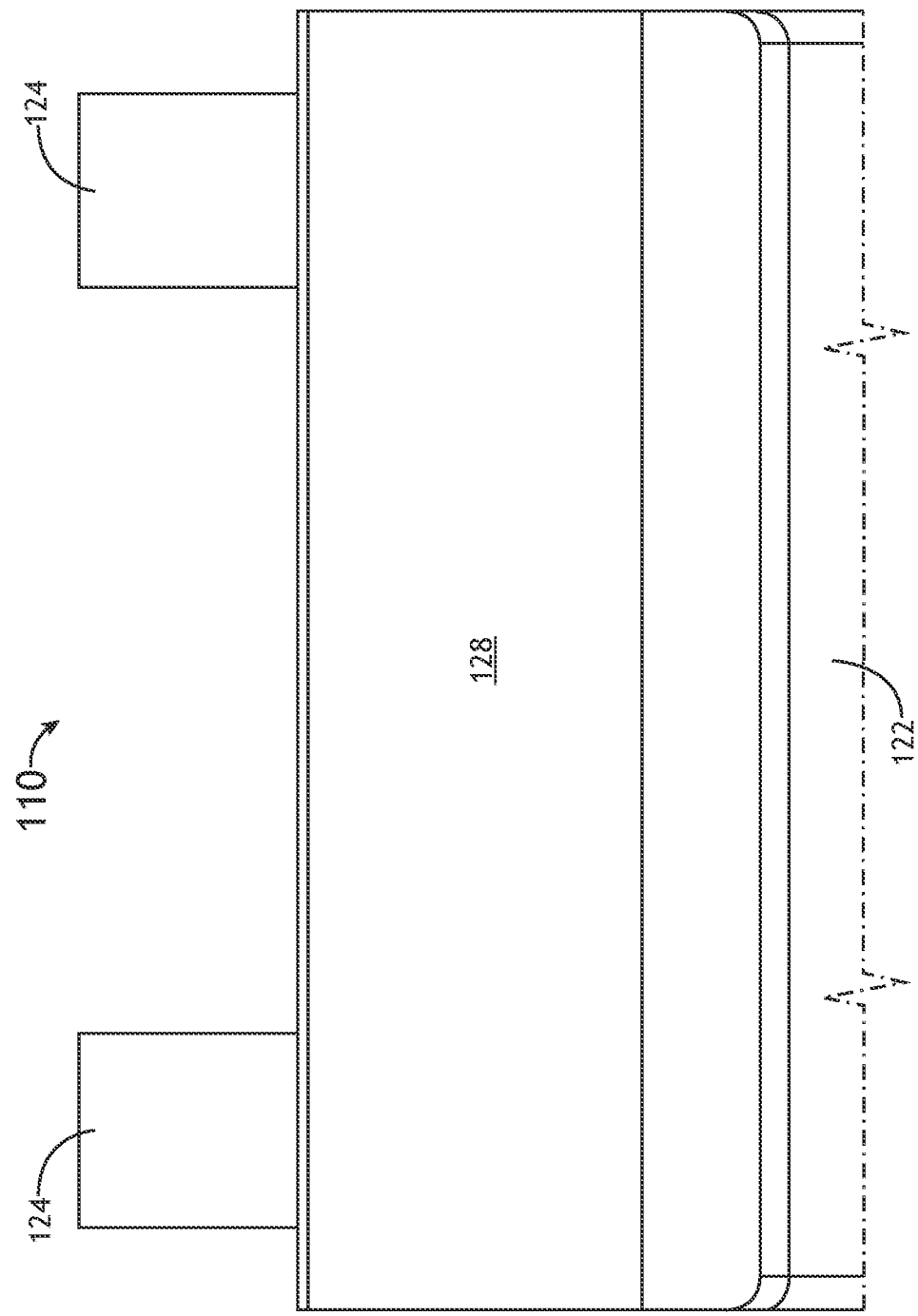
FIG. 6 is another view of the pliable stowage pouch of FIG. 1 according to the inventive concepts disclosed herein.

The pliable stowage pouch 110 may be accessible by a passenger seated behind the seat frame 102. The pliable stowage pouch 110 may include: an opening 112 located at an aft side of the seat frame 102; a top panel 114 extending from the opening 112; an end panel 116 abutting the top panel 114; a first side panel 118 abutting the top panel 114 and the end panel 116, the first side panel 118 being elbow-shaped; a second side panel abutting the top panel 114 and the end panel 116, the second side panel 118 being elbow-shaped; a bottom panel 120 abutting the first side panel 118, the second side panel 118, and the end panel 116; a curved panel 122 extending from the opening 112 toward the bottom panel 120 and abutting the first side panel 118, the second side panel 118, and the bottom panel 120; a closeout flap 128 (as shown in FIGS. 3, 4, and 6) extending from a top edge of the opening 112 and abutting the top panel 114, wherein the closeout flap 128 is configured to close the opening 112 in a first state (e.g., a zipped state) and to open the opening in a second state (e.g., an unzipped state); aft straps 124 attached to the top panel 114 and secured around the aft seat frame beam 106; and/or fore straps 124 attached to the top panel 114 and secured around the fore seat frame beam 108.

In some embodiments, the pliable stowage pouch 110 further includes first and second flexible shaping structures 126. The first flexible shaping structure 126 may abut the first side panel 118 and extend from the opening 112 along the first side panel 118 toward the bottom panel 120. The second flexible shaping structure 126 may abut the second side panel 118 and extend from the opening 112 along the second side panel 118 toward the bottom panel 120. In some embodiments, each of the first and second flexible shaping structures 126 may be at least composed of a rubber material (e.g., neoprene rubber).

In some embodiments, each of the top panel 114, the end panel 116, the bottom panel 120, the first side panel 118, the second side panel 118, the curved panel 122, and the closeout flap 128 may at least be composed of fabric.

In some embodiments, an angle between the top panel 114 and the end panel 116 may be obtuse. In some embodiments, an angle between the bottom panel 120 and the curved panel 122 may be obtuse. In some embodiments, an angle between the bottom panel 120 and the end panel 116 may be a right angle. In some embodiments, an angle between the bottom panel 120 and the first side panel 118 is a right angle, and an angle between the bottom panel 120 and the second side panel 118 is a right angle. In some embodiments, the aft seat frame beam 106 is higher than the fore seat frame 108.

Figure 2:
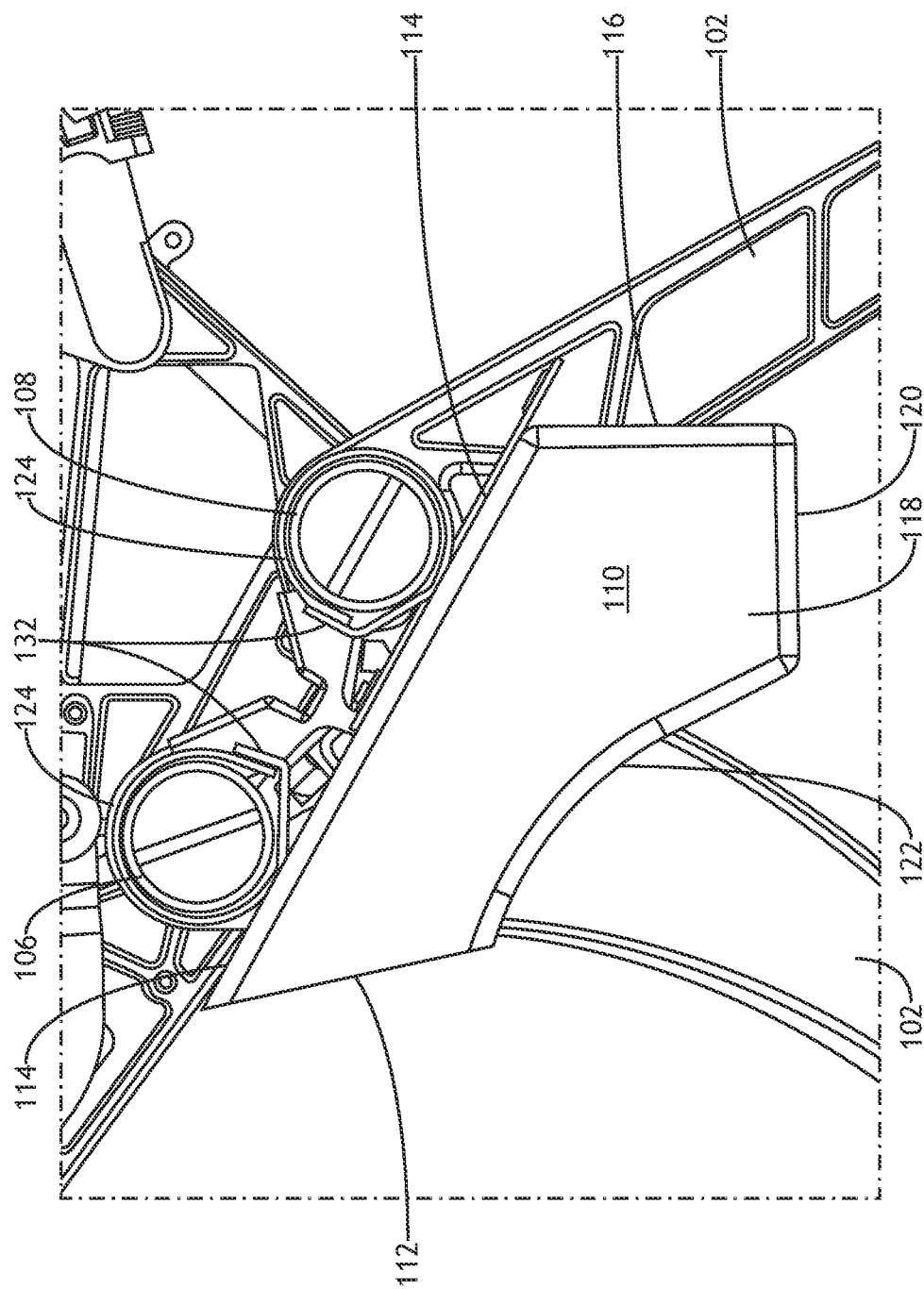
FIG. 2 is a side view of an exemplary embodiment of the seat frame and the pliable stowage pouch of FIG. 1 according to the inventive concepts disclosed herein.

Referring now to FIG. 2, a side view of the system including the seat frame 102 and the pliable stowage pouch 110 of FIG. 1 is shown.

Referring now to FIG. 3, an aft side perspective view of an exemplary embodiment of the pliable stowage pouch 110 of FIG. 1 is shown. As shown in FIG. 3, the pliable stowage pouch 110 may include the closeout flap 128 extending from a top edge of the opening 112 and abutting the top panel 114. In some embodiments, the closeout flap 128 may be configured to close the opening in the first state (e.g., a zipped state) via a zipper 130 extending at least along an edge of the closeout flap 128 and an edge of the curved panel 122. In some embodiments, the closeout flap 128 may be configured to close the opening 112 in the first state (e.g., a zipped state) via the zipper 130 extending at least along edges of the closeout flap 128 and an edge of the curved panel 122, an edge of the first side panel 118, and an edge of the second side panel. In some embodiments, the closeout flap 128 may be attached to the top panel 114, such as with stitches, or the closeout flap 128 may be an extension of the top panel 114. The closeout flap 128 may be opened at the bottom.

Referring now to FIG. 4, another aft side perspective view of an exemplary embodiment of the pliable stowage pouch 110 of FIG. 1 is shown.

Figure 5:
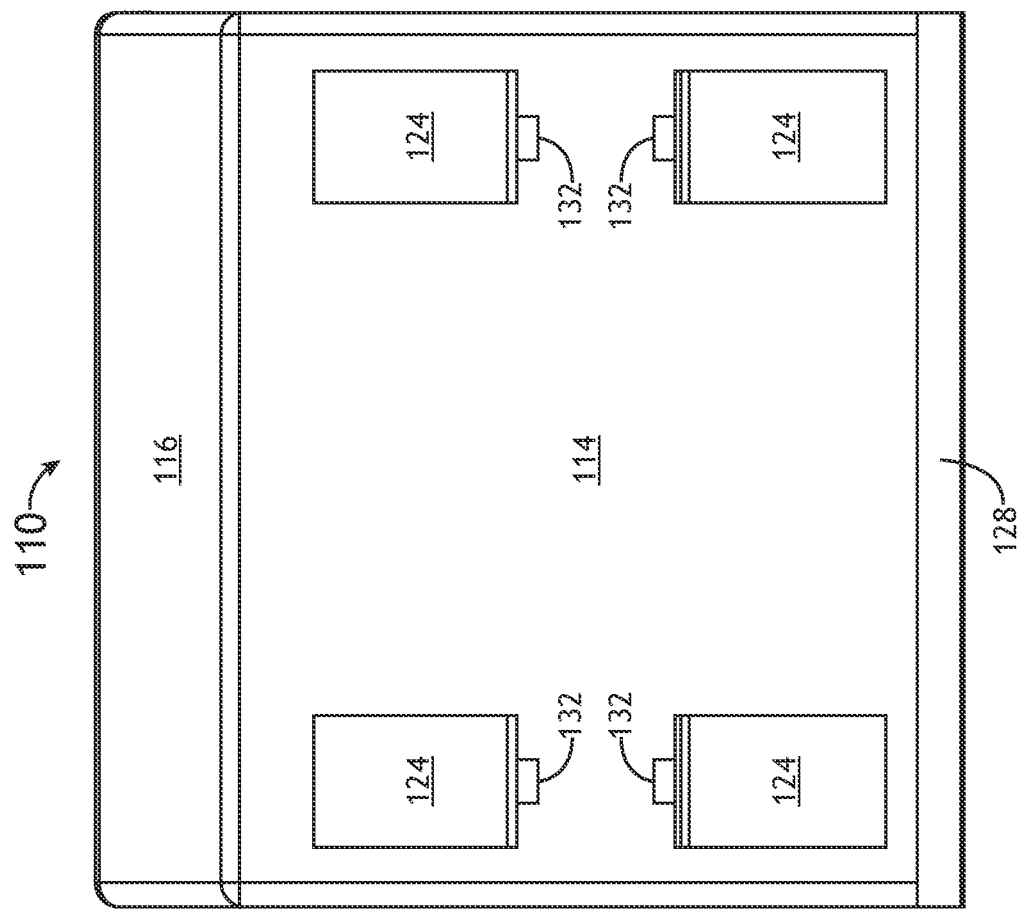
FIG. 5 is top side view of the pliable stowage pouch of FIG. 1 according to the inventive concepts disclosed herein.

Referring now to FIG. 5, a top side view of an exemplary embodiment of the pliable stowage pouch 110 of FIG. 1 is shown. In some embodiments, each of the aft straps 124 and the fore straps 124 may include a strap and a button 132, wherein each button 132 is configured to secure a given strap around one of the fore seat frame beam 108 or the aft seat frame beam 106. In some embodiments, each of the straps 124 is composed of at least one of plastic, leather, or fabric (e.g., canvas or soft cloth). In some embodiments, when each of the aft straps 124 are secured around the aft seat frame beam 106, the button 132 of each of the aft straps 124 is positioned on a fore side of the aft seat frame beam 106, and when each of the fore straps 124 are secured around the fore seat frame 108, the button 132 of each of the fore straps 124 is positioned on an aft side of the fore seat frame beam 108; for example, positions of the buttons 132 of the fore straps 124 and the aft straps 124 being in between the fore seat frame beam 108 and the aft seat frame beam 106 may inhibit the passenger seated behind the seat frame 102 from viewing and accessing the buttons 132.

Referring now to FIG. 6, an aft perspective view of an exemplary embodiment of the pliable stowage pouch 110 of FIG. 1 is shown.

Figure 7:
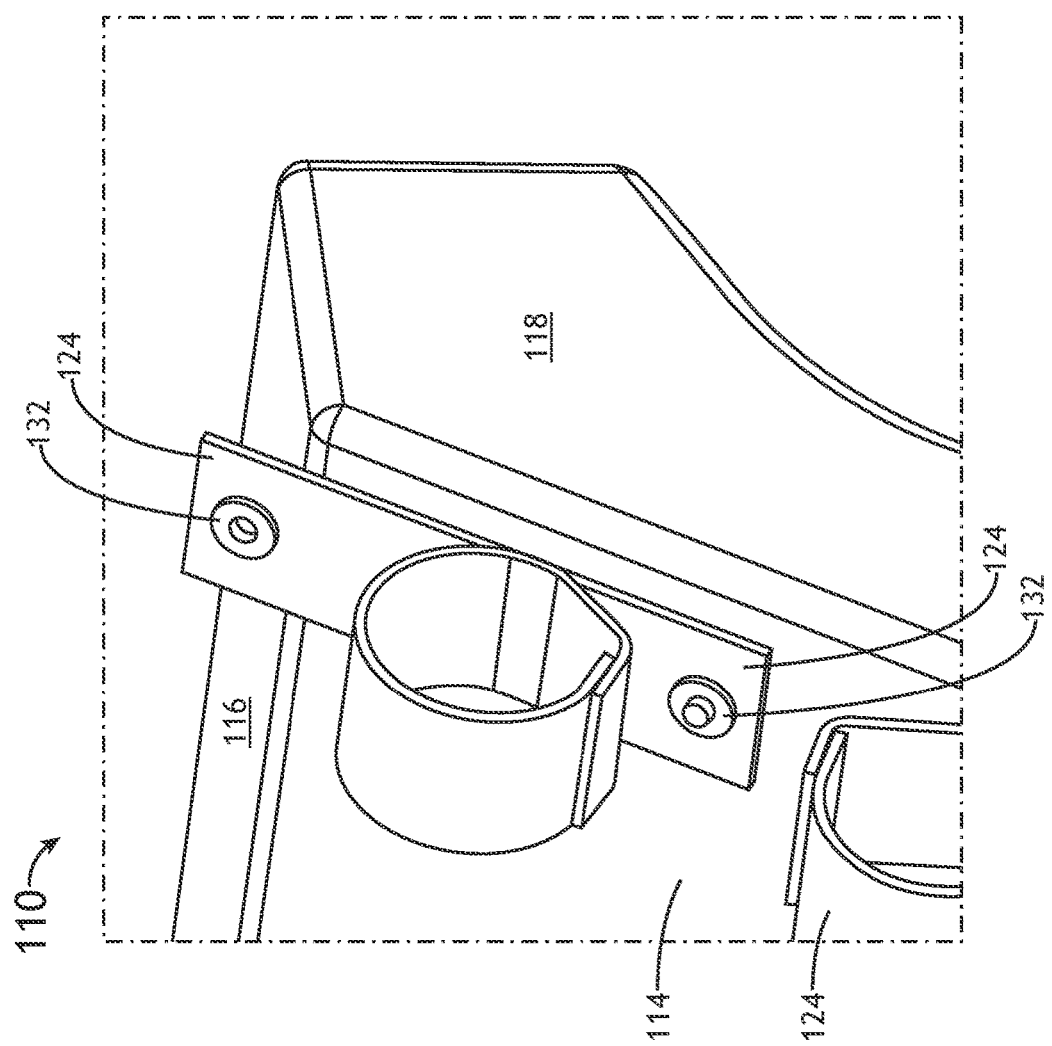
FIG. 7 is another view of the pliable stowage pouch of FIG. 1 according to the inventive concepts disclosed herein.

Referring now to FIG. 7, a top perspective view of an exemplary embodiment of the pliable stowage pouch 110 of FIG. 1 is shown.

Figure 8:
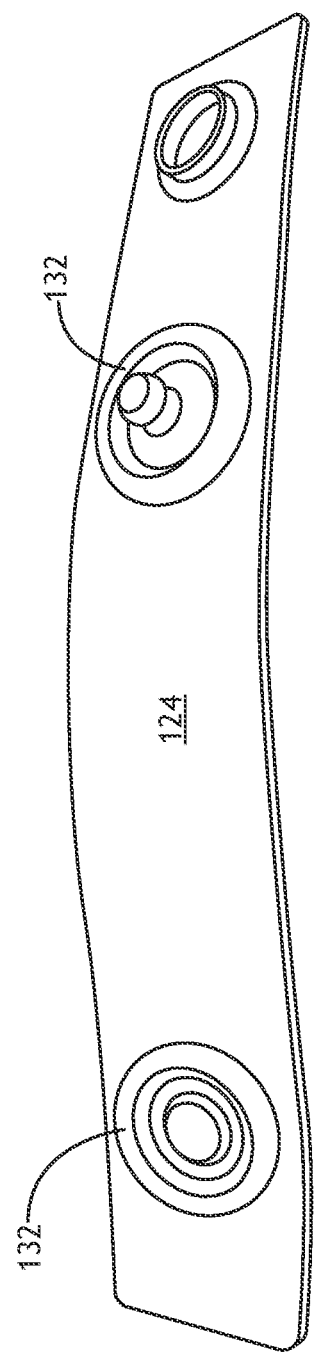
FIG. 8 is a view an exemplary embodiment of a strap of the pliable stowage pouch of FIG. 1 according to the inventive concepts disclosed herein.

Referring now to FIG. 8, a view of an exemplary embodiment of one of the straps 124 of the pliable stowage pouch 110 of FIG. 1 is shown.

Figure 9:
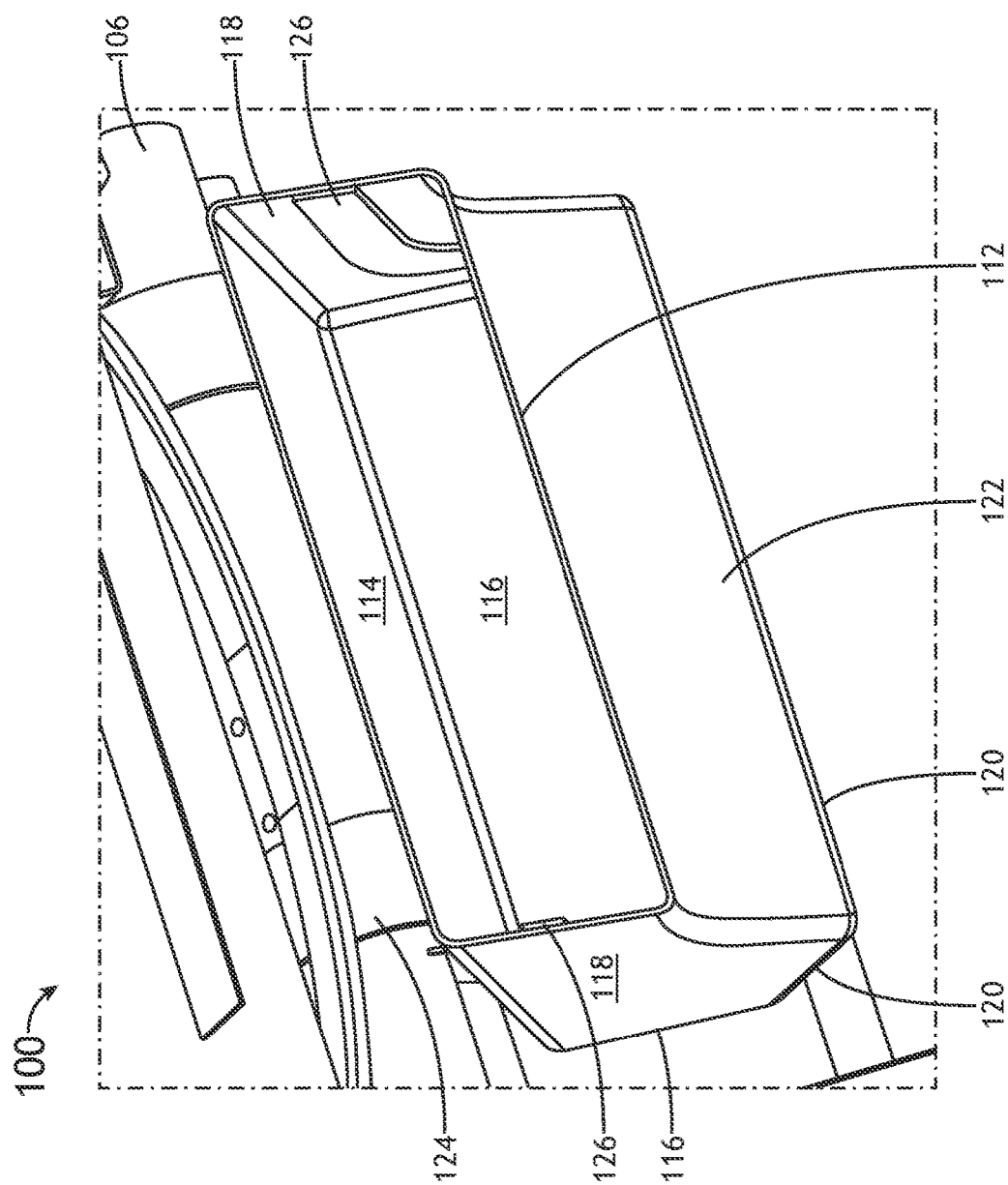
FIG. 9 is another aft side perspective view of an exemplary embodiment of the seat frame and the pliable stowage pouch of FIG. 1 according to the inventive concepts disclosed herein.

Referring now to FIG. 9, an aft side perspective view of an exemplary embodiment of the pliable stowage pouch 110 of FIG. 1 is shown.

As will be appreciated from the above, embodiments of the inventive concepts disclosed herein may be directed to a system including a stowage pouch.

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   a seat frame installed in a vehicle, the seat frame comprising a seat pan, a fore seat frame beam, and an aft seat frame beam, wherein the fore seat frame beam and the aft seat frame beam are under the seat pan, wherein the fore seat frame beam is parallel to the aft seat frame; and
   a pliable stowage pouch accessible by a passenger seated behind the seat frame, comprising:
      an opening located at an aft side of the seat frame;
      a top panel extending from the opening;
      an end panel abutting the top panel;
      a first side panel abutting the top panel and the end panel, the first side panel being elbow-shaped;
      a second side panel abutting the top panel and the end panel, the second side panel being elbow-shaped;
      a bottom panel abutting the first side panel, the second side panel, and the end panel;
      a curved panel extending from the opening toward the bottom panel and abutting the first side panel, the second side panel, and the bottom panel;
      a closeout flap extending from a top edge of the opening and abutting the top panel, wherein the closeout flap is configured to close the opening in a first state and to open the opening in a second state;
      aft straps attached to the top panel and secured around the aft seat frame beam, and fore straps attached to the top panel and secured around the fore seat frame beam.

2. The system of claim 1, wherein the closeout flap is configured to close the opening in the first state via a zipper extending at least along an edge of the closeout flap and an edge of the curved panel.

3. The system of claim 2, wherein the closeout flap is configured to close the opening in the first state via a zipper extending at least along edges of the closeout flap and an edge of the curved panel, an edge of the first side panel, and an edge of the second side panel.

4. The system of claim 1, wherein the pliable stowage pouch further comprises first and second flexible shaping structures, the first flexible shaping structure abutting the first side panel and extending from the opening along the first side panel toward the bottom panel, the second flexible shaping structure abutting the second side panel and extending from the opening along the second side panel toward the bottom panel.

5. The system of claim 4, wherein each of the first and second flexible shaping structures are at least composed of a rubber material.

6. The system of claim 5, wherein the rubber material is neoprene rubber.

7. The system of claim 1, wherein each of the aft straps and the fore straps comprises a strap and a button, wherein each button is configured to secure a given strap around one of the fore seat frame beam or the aft seat frame beam.

8. The system of claim 7, wherein each of the straps is composed of at least one of plastic, leather, or fabric.

9. The system of claim 7, wherein when each of the aft straps are secured around the aft seat frame beam, the button of each of the aft straps is positioned on a fore side of the aft seat frame beam, wherein when each of the fore straps are secured around the fore seat frame, the button of each of the fore straps is positioned on an aft side of the fore seat frame beam.

10. The system of claim 9, wherein positions of the buttons of the fore straps and the aft straps being in between the fore seat frame beam and the aft seat frame beam inhibits the passenger seated behind the seat frame from viewing and accessing the buttons.

11. The system of claim 1, wherein each of the top panel, the end panel, the bottom panel, the first side panel, the second side panel, the curved panel, and the closeout flap is at least composed of fabric.

12. The system of claim 1, wherein an angle between the top panel and the end panel is obtuse.

13. The system of claim 12, wherein an angle between the bottom panel and the curved panel is obtuse.

14. The system of claim 13, wherein an angle between the bottom panel and the end panel is a right angle.

15. The system of claim 14, wherein an angle between the bottom panel and the first side panel is a right angle, wherein an angle between the bottom panel and the second side panel is a right angle.

16. The system of claim 15, wherein the aft seat frame beam is higher than the fore seat frame beam.

17. The system of claim 1, wherein the vehicle is an aircraft.

* * * * *